(12) United States Patent
Hitomi

(10) Patent No.: US 10,868,966 B2
(45) Date of Patent: Dec. 15, 2020

(54) IMAGING APPARATUS AND IMAGING METHOD

(71) Applicant: SONY CORPORATION, Tokyo (JP)

(72) Inventor: Yasunobu Hitomi, Kanagawa (JP)

(73) Assignee: SONY CORPORATION, Tokyo (JP)

(*) Notice: Subject to any disclaimer, the term of this patent is extended or adjusted under 35 U.S.C. 154(b) by 79 days.

(21) Appl. No.: 15/747,476

(22) PCT Filed: Jun. 1, 2017

(86) PCT No.: PCT/JP2017/020395
§ 371 (c)(1),
(2) Date: Jan. 25, 2018

(87) PCT Pub. No.: WO2017/217240
PCT Pub. Date: Dec. 21, 2017

(65) Prior Publication Data
US 2019/0109972 A1    Apr. 11, 2019

(30) Foreign Application Priority Data

Jun. 15, 2016 (JP) ................... 2016-118577

(51) Int. Cl.
*G01C 3/08* (2006.01)
*H04N 5/235* (2006.01)
(Continued)

(52) U.S. Cl.
CPC ......... *H04N 5/2354* (2013.01); *G01S 7/4816* (2013.01); *G01S 17/08* (2013.01);
(Continued)

(58) Field of Classification Search
CPC ........ G01S 7/4816; G01S 17/08; G01S 17/89; H04N 5/2256; H04N 5/2354; H04N 5/365;
(Continued)

(56) References Cited

U.S. PATENT DOCUMENTS

| 9,442,196 | B2 * | 9/2016 | Buettgen ............... G01S 17/894 |
| 2006/0192938 | A1 | 8/2006 | Kawahito |

(Continued)

FOREIGN PATENT DOCUMENTS

| JP | 2004-294420 A | 10/2004 |
| JP | 2016-092593 A | 5/2016 |

(Continued)

OTHER PUBLICATIONS

International Search Report and Written Opinion of PCT Application No. PCT/JP2017/020395, dated Aug. 29, 2017, 07 pages.

*Primary Examiner* — Mark Hellner
(74) *Attorney, Agent, or Firm* — Chip Law Group

(57) ABSTRACT

Provided is an imaging apparatus and an imaging method capable of generating distance information and an image. The imaging apparatus includes a light source that emits light, an accumulation unit, charges corresponding to received light being accumulated in the accumulation unit, a distance information generation unit that generates distance information from an amount of the charges accumulated in the accumulation unit, and an image generation unit that generates an image from the amount of the charges accumulated in the accumulation unit, the distance information generation unit generating the distance information from the amount of the charges accumulated in the accumulation unit based on emission of light, the image generation unit generating the image from the amount of the charges accumulated in the accumulation unit based on absence of the emitted light.

11 Claims, 9 Drawing Sheets

(51) Int. Cl.
*H04N 5/355* (2011.01)
*G01S 17/89* (2020.01)
*G01S 7/481* (2006.01)
*G01S 17/08* (2006.01)
*H04N 5/232* (2006.01)

(52) U.S. Cl.
CPC ........... *G01S 17/89* (2013.01); *H04N 5/2353* (2013.01); *H04N 5/23277* (2013.01); *H04N 5/355* (2013.01); *H04N 5/35554* (2013.01)

(58) Field of Classification Search
CPC ............. H04N 5/2353; H04N 5/35554; H04N 5/23277
USPC ....................................................... 356/4.01
See application file for complete search history.

(56) References Cited

U.S. PATENT DOCUMENTS

2016/0119594 A1 4/2016 Asano et al.
2020/0005305 A1* 1/2020 Ravi ....................... H04L 67/12

FOREIGN PATENT DOCUMENTS

WO 2004/070313 A1 8/2004
WO 2015/011869 A1 1/2015

* cited by examiner

IMAGING APPARATUS AND IMAGING METHOD

CROSS REFERENCE TO RELATED APPLICATIONS

This application is a U.S. National Phase of International Patent Application No. PCT/JP2017/020395 filed on Jun. 1, 2017, which claims priority benefit of Japanese Patent Application No. JP 2016-118577 filed in the Japan Patent Office on Jun. 15, 2016. Each of the above-referenced applications is hereby incorporated herein by reference in its entirety.

TECHNICAL FIELD

The present technology relates to an imaging apparatus, an imaging method, and a program, and to, for example, an imaging apparatus, an imaging method, and a program that are capable of satisfactorily performing distance measurement and imaging.

BACKGROUND ART

The speed of light is $3\times10^8$ (m/s). It has been proposed to measure the distance to a target object by applying light, receiving reflected light from the target object, and measuring the delay time, by using the fact that the speed of light is known. One such proposal is a TOF (Time of Flight) method, and a method of measuring the distance to a target object by measuring the time of flight of light has been proposed (see, for example, Patent Literature 1).

CITATION LIST

Patent Literature

Patent Literature 1: Japanese Patent Application Laid-open No. 2004-294420

DISCLOSURE OF INVENTION

Technical Problem

Since there is a need to apply irradiation light in the case of measuring the distance to a target object by using the TOF method, it has been difficult to pick up an image with only environment light at the time of a TOF operation.

The present technology has been made in view of the above circumstances to make it possible to satisfactorily perform measurement of a distance to a target object and imaging.

Solution to Problem

An imaging apparatus according to an aspect of the present technology includes: a light source that emits light; an accumulation unit, charges corresponding to received light being accumulated in the accumulation unit; a distance information generation unit that generates distance information from an amount of the charges accumulated in the accumulation unit; and an image generation unit that generates an image from the amount of the charges accumulated in the accumulation unit, the distance information generation unit generating, when the light source emits the light, the distance information from the amount of the charges accumulated in the accumulation unit, the image generation unit generating, when the light source emits no light, the image from the amount of the charges accumulated in the accumulation unit.

An imaging method according to an aspect of the present technology is an imaging method for an imaging apparatus including a light source that emits light, the imaging method including: accumulating charges corresponding to received light; generating distance information from an amount of the accumulated charges; generating an image from the amount of the accumulated charges; generating, when the light source emits the light, the distance information from the amount of the accumulated charges; and generating, when the light source emits no light, the image from the amount of the accumulated charges.

A program according to an aspect of the present technology is a program that causes a computer controlling an imaging apparatus including a light source that emits light to execute the steps of: accumulating charges corresponding to received light; generating distance information from an amount of the accumulated charges; generating an image from the amount of the accumulated charges; generating, when the light source emits the light, the distance information from the amount of the accumulated charges; and generating, when the light source emits no light, the image from the amount of the accumulated charges.

In an imaging apparatus, an imaging method, and a program according to an aspect of the present technology, a light source that emits light is provided, charges corresponding to received light are accumulated, and distance information and an image are generated from an amount of the accumulated charges. The distance information is generated from the amount of the accumulated charges when the light source emits the light, and the image is generated from the amount of the accumulated charges when the light source emits no light.

Note that the imaging apparatus may be an independent apparatus, and may be an internal block constituting one apparatus.

Further, the program can be provided by being transmitted via a transmission medium or being recorded in a recording medium.

Advantageous Effects of Invention

According to an aspect of the present technology, it is possible to satisfactorily perform measurement of a distance to a target object and imaging.

It should be noted that the effect described here is not necessarily limitative and may be any effect described in the present disclosure.

MODE(S) FOR CARRYING OUT THE INVENTION

Hereinafter, embodiments for carrying out the present technology (hereinafter, referred to as embodiments) will be described.

<Configuration of Imaging Apparatus>

Figure 1:
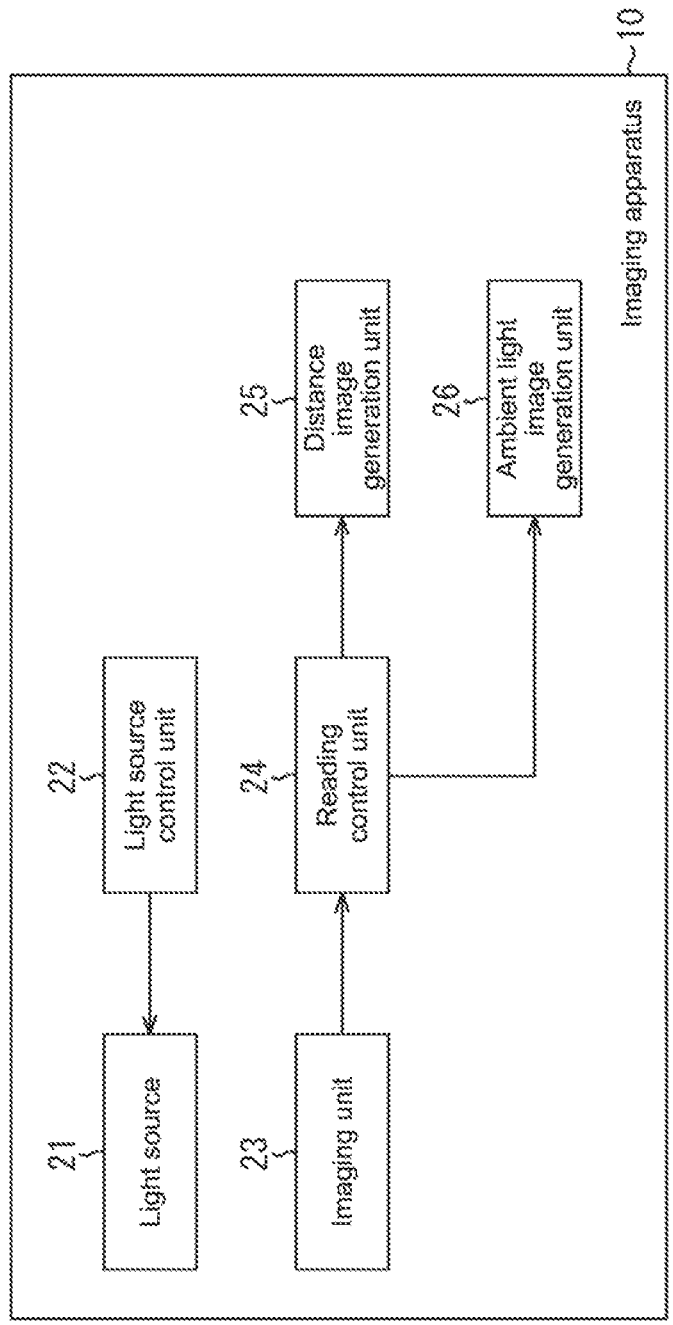
FIG. 1 is a diagram showing a configuration of an embodiment of an imaging apparatus to which the present technology is applied.

FIG. 1 is a diagram showing a configuration of an embodiment of an imaging apparatus to which the present technology is applied. An imaging apparatus 10 shown in FIG. 1 includes a light source 21, a light source control unit 22, an imaging unit 23, a reading control unit 24, a distance image generation unit 25, and an ambient light image generation unit 26.

The imaging apparatus 10 has a distance measurement function for measuring a distance to a target object (subject) and an imaging function for imaging a subject. In order to achieve the distance measurement function, the imaging apparatus 10 includes the light source 21 and the light source control unit 22. The light source control unit 22 controls light emission of the light source 21 as will be described later.

The imaging unit 23 includes an imaging device, and receives reflected light, which is emitted from the light source 21, applied to a target object, and reflected by the target object. Note that this reflected light includes light from the light source 21 and light by ambient light. Further, the imaging unit 23 receives also reflected light, which is ambient light applied to the target object and reflected by the target object, when light emission of the light source 21 is stopped.

The reading control unit 24 supplies a signal from the imaging unit 23 to the distance image generation unit 25 when receiving reflected light, which is light emitted from the light source 21, and supplies a signal from the imaging unit 23 to the ambient light image generation unit 26 when receiving reflected light of only ambient light.

The distance image generation unit 25 generates an image relating to a distance to a target object. Note that although description will be continued here on the assumption that a distance image is generated, distance information other than the distance image may be generated. The ambient light image generation unit 26 generates an image of a target object (subject) with ambient light.

As a method of measuring a distance, a case of using the TOF (Time To Flight) method will be described as an example. In the case of constituting a TOF sensor, an imaging device constituting the imaging unit 23 has a structure shown in FIG. 2, for example.

Figure 2:
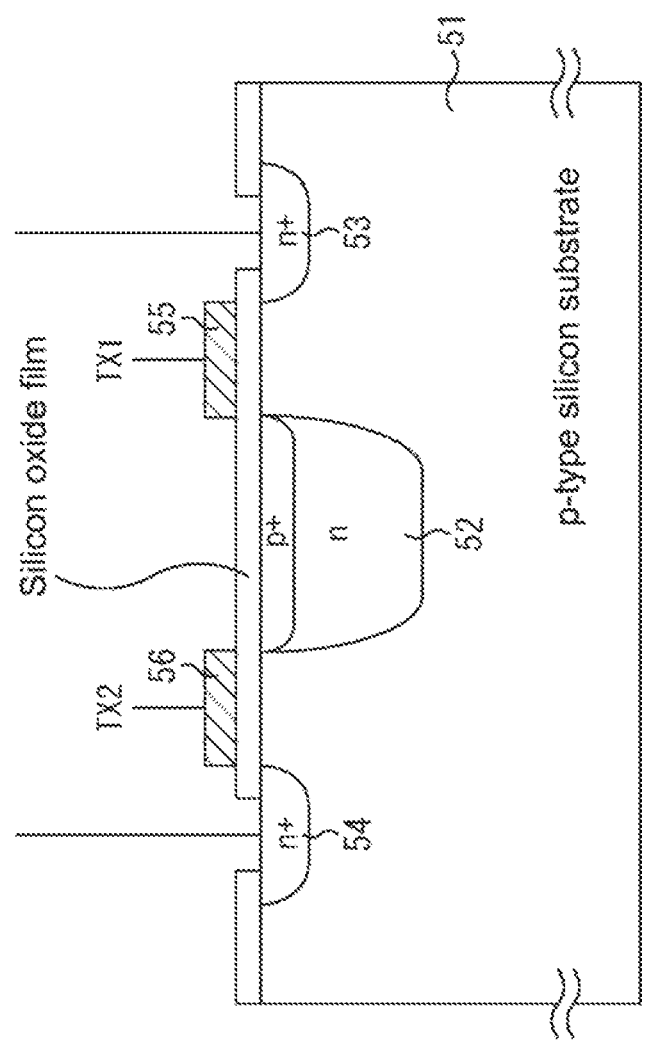
FIG. 2 is a diagram showing a structure of an image.

FIG. 2 shows one pixel in a pixel group constituting the imaging unit 23, and an example of constituting one TOF sensor. Each pixel constituting a TOF sensor includes an embedded photodiode. A P-type silicon substrate 51 has a structure for transferring charges accumulated in an n+ area 52 to two diffusion layers (n+ area 53 and n+ area 54).

This transfer is controlled on the basis of a control signal TX1 and a control signal TX2 respectively supplied to a transfer gate 55 and a transfer gate 56 via a control signal line TX1 and a control signal line TX2. As will be described later, charges accumulated in the n+ area 52 are alternately transferred to the n+ area 53 and the n+ area 54, and the charges are accumulated.

Note that although description will be continued here with a case of transferring charges to two diffusion layers as an example as shown in FIG. 2, the present technology is applicable also to a case of constituting a TOF sensor with a structure for distributing charges by using an electric field, and a case of constituting a TOF sensor by using a set of two photodiodes.

The TOF sensor is a sensor that measures a distance to a target object by measuring the time period from when the TOF sensor itself emits light to when the light is applied to the target object and returned by being reflected by the target object. The TOF sensor operates at timing shown in FIG. 3, for example.

Figure 3:
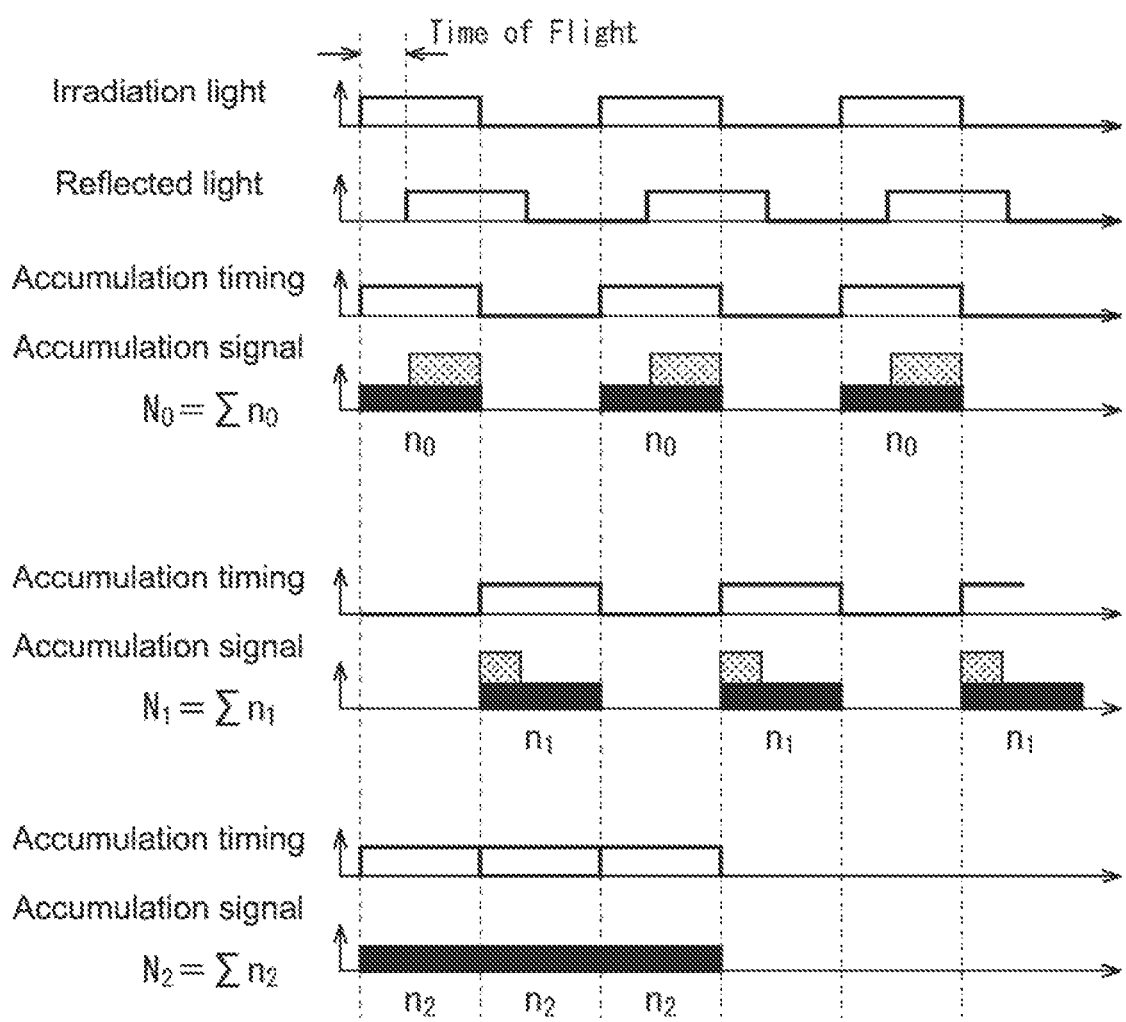
FIG. 3 is a diagram for describing calculation of a distance by a TOF method.

Irradiation light is applied to a target object for only a predetermined time period, e.g., a pulse emission time period Tp here. The emitted irradiation light is applied to the target object, and returns by being reflected by the target object. This reflected light is received by the photodiode 52. As shown in FIG. 3, the time period from when application of irradiation light is started to when reflected light is received depends on the distance to the target object.

In the description of FIG. 3 and subsequent figures, the n+ area 53 will be described as a first tap 53 and the n+ area 54 will be described as a second tap 54.

The first tap 53 receives light for only the pulse emission time period Tp from when application of irradiation light is started. During the time, background light (reflected light, which is ambient light applied to a target object and reflected by the target object) and reflected light (reflected light, which is irradiation light applied to a target object and reflected by the target object) are received. A signal n0 is acquired from the amount of light accumulated by one light reception.

The second tap 54 receives light for only the pulse emission time period Tp from when light reception of the first tap 53 is finished. During the time, background light and reflected light are received. A signal n1 is acquired from the amount of light accumulated by one light reception.

As described above, by performing driving with the phase of the timing of accumulation completely reversed, the signal n0 and the signal n1 are acquired. Such driving is performed a plurality of times, accumulation and integration are performed, and thus, a signal N0 and a signal N1 are acquired. A distance D is calculated from the signal N0 and the signal N1 obtained in this way.

The signal N0 and the signal N1 (the signal n0 and the signal n1) include a signal accumulated by receiving background light. In order to leave a signal from reflected light by excluding the background light, accumulation and integration are performed also on the background light, and thus, a signal N2 is acquired.

By using the signal N0, the signal N1, and the signal N2 acquired in this way, the distance D is calculated by the following equations (1) and (2).

[Math. 1]

$$\Delta\phi = \frac{N_0 - N_2}{N_0 + N_1 - 2 \cdot N_2} \quad (1)$$

$$D = \frac{c \cdot T_p}{2}\left(1 - \frac{\Delta\phi}{2\pi}\right) \quad (2)$$

In the equation (1) and the equation (2), D represents a distance, c represents the speed of light, and $T_p$ represents a pulse emission time period. In this way, the distance D to a target object can be obtained.

As irradiation light of the TOF sensor, near infrared light having a wavelength of around 850 nm is often used. This irradiation light is emitted from the light source 21 (FIG. 1), and the irradiation light from the light source 21 is controlled by the light source control unit 22. The light source control unit 22 performs control of repeating on and off at a predetermined cycle as described with reference to FIG. 3.

The imaging unit 23 accumulates charges at the first tap 53 and the second tap 54. The reading control unit 24 reads the charges accumulated in the first tap 53 and the second tap 54 at the time when the time period in which it functions as a TOF sensor is finished, and supplies the read charges to the distance image generation unit 25.

The distance image generation unit 25 calculates a distance to a target object on the basis of the above-mentioned equations (1) and (2). The calculated distance may be output as distance information as it is. Alternatively, by executing processing such as coloring with a color depending on the calculated distance, a distance image may be generated and output.

By the above-mentioned processing, the imaging apparatus 10 generates a distance image (distance information). Meanwhile, the imaging apparatus 10 executes also processing of imaging a subject with ambient light to generate a picked-up image. The processing (driving) of the imaging apparatus 10 in the case of generating a distance image and a picked-up image will be described below as first to fourth driving methods.

<First Driving Method>

Figure 4:
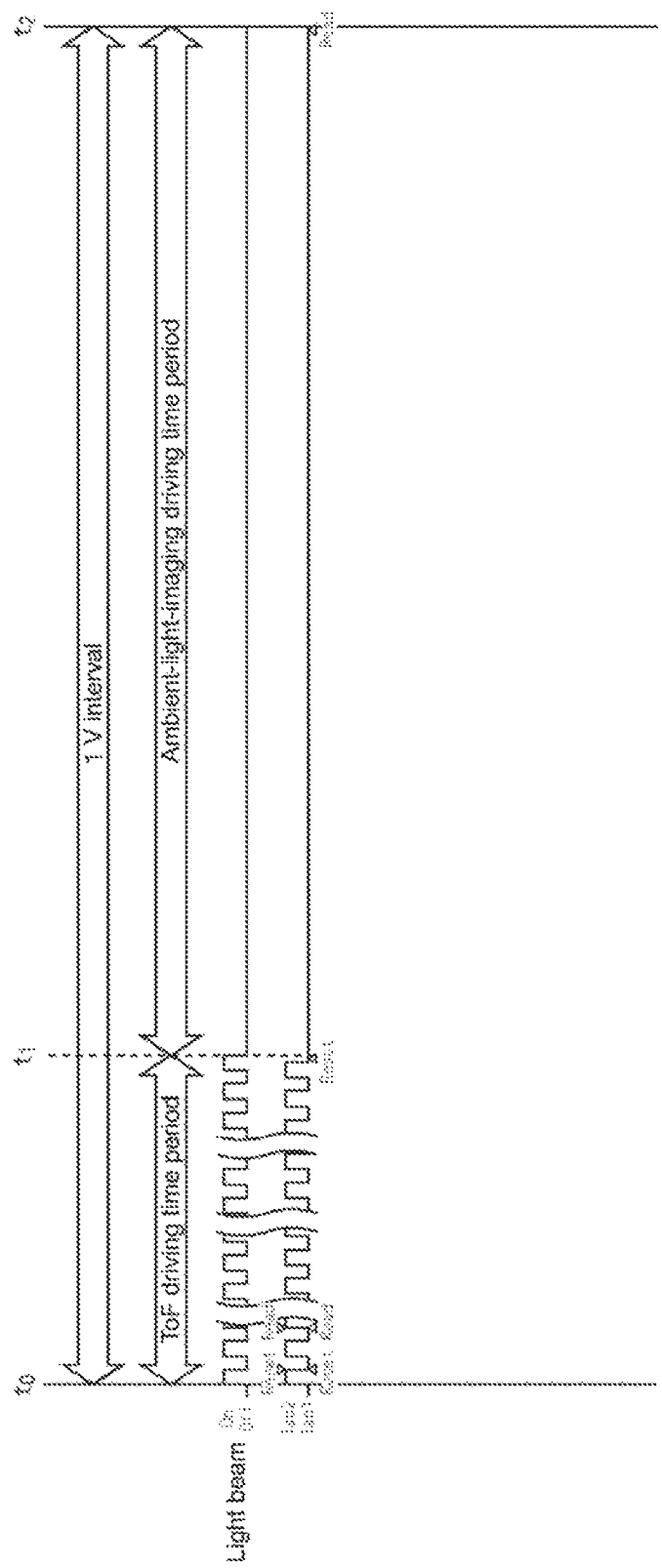
FIG. 4 is a diagram for describing a first driving method.

FIG. 4 is a timing chart for describing a first driving method. For example, in the case of picking up a moving image, a time period for acquiring one frame (described as 1 V interval in the figure) is divided into a time period for TOF driving and a time period for imaging with ambient light (ambient-light-imaging), and driving is performed in the respective time periods. Note that an image to be picked up may be a still image or a moving image.

The time period from a time t0 to a time t1 is a TOF driving time period. In the TOF driving time period, TOF driving is performed as described with reference to FIG. 3, and distance information (distance image) is acquired. In the TOF driving time period, the light source 21 is repeatedly turned on and off at a predetermined cycle. Further, in the TOF driving time period, charges are alternately transferred to the first tap 53 (Tap1) and the second tap 54 (tap2), accumulated, and read.

At the start of the TOF driving time period, a reset (Reset) operation is performed on the first tap 53 and the second tap 54, and then, charges are transferred, accumulated, and read. Note that in the figure, "Read" in the TOF driving time period represents the start of transfer and accumulation of charges, and reading of charges from the first tap 53 and the second tap 54 is performed before the start of an ambient-light-imaging driving period.

Further, the reading is controlled by the reading control unit 24 (FIG. 1), and a signal read from the first tap 53 or the second tap 54 is supplied to the distance image generation unit 25 and used for generating distance information.

The time period from the time t1 to a time t2 is the ambient-light-imaging driving time period. In the ambient-light-imaging driving time period, charges are transferred to the first tap 53 and accumulated, and the accumulated charges are read. In the ambient-light-imaging driving time period, the light source 21 is in an off-state. That is, light emission of the light source 21 is stopped.

At the start (time t1) of the ambient-light-imaging driving time period or the time before that, reset processing is executed on the first tap 53, and thus, the charges in the first tap 53 are swept out.

After the reset processing, charges are accumulated. Then, at the time t2, the charges accumulated in the first tap 53 are read under the control of the reading control unit 24, and supplied to the ambient light image generation unit 26.

The ambient light image generation unit 26 generates an image on the basis of the signal read from the first tap 53. This signal to be read is a signal depending on the amount of light received when the light source 21 is in an off-state. That is, it is a signal depending on the amount of received light, which is ambient light applied to a target object (subject) and reflected by the target object.

As described above, it is possible to divide the 1 V interval into the TOF driving time period and the ambient-light-imaging driving time period, and acquire distance information in the TOF driving time period and an image of a subject with ambient light in the ambient-light-imaging driving time period.

Note that the TOF driving time period (from the time t0 to the time t1) and the ambient-light-imaging driving time period (from the time t1 to the time t2) may be appropriately changed depending on, for example, the ambient-imaging driving time period, i.e., exposure time period for performing imaging with ambient light. In other words, the TOF driving time period and the ambient-light-imaging driving time period may each be a fixed time period or a variable time period.

Further, for example, the reading of a signal from the first tap 53 may be performed before the time t2 depending on the ambient-light-imaging driving time period (exposure time period). Further, although a case where the ambient-light-imaging driving time period is provided after the TOF driving time period has been described here as an example, the TOF driving time period may be provided after the ambient-light-imaging driving time period.

Further, an example where the first tap 53 is driven in the ambient-light-imaging driving time period has been shown in the example described with reference to FIG. 4, the second tap 54 may be driven. Further, as in the second to fourth driving methods described below, both of the first tap 53 and the second tap 54 may be driven in the ambient-light-imaging driving time period.

<Second Driving Method>

Figure 5:
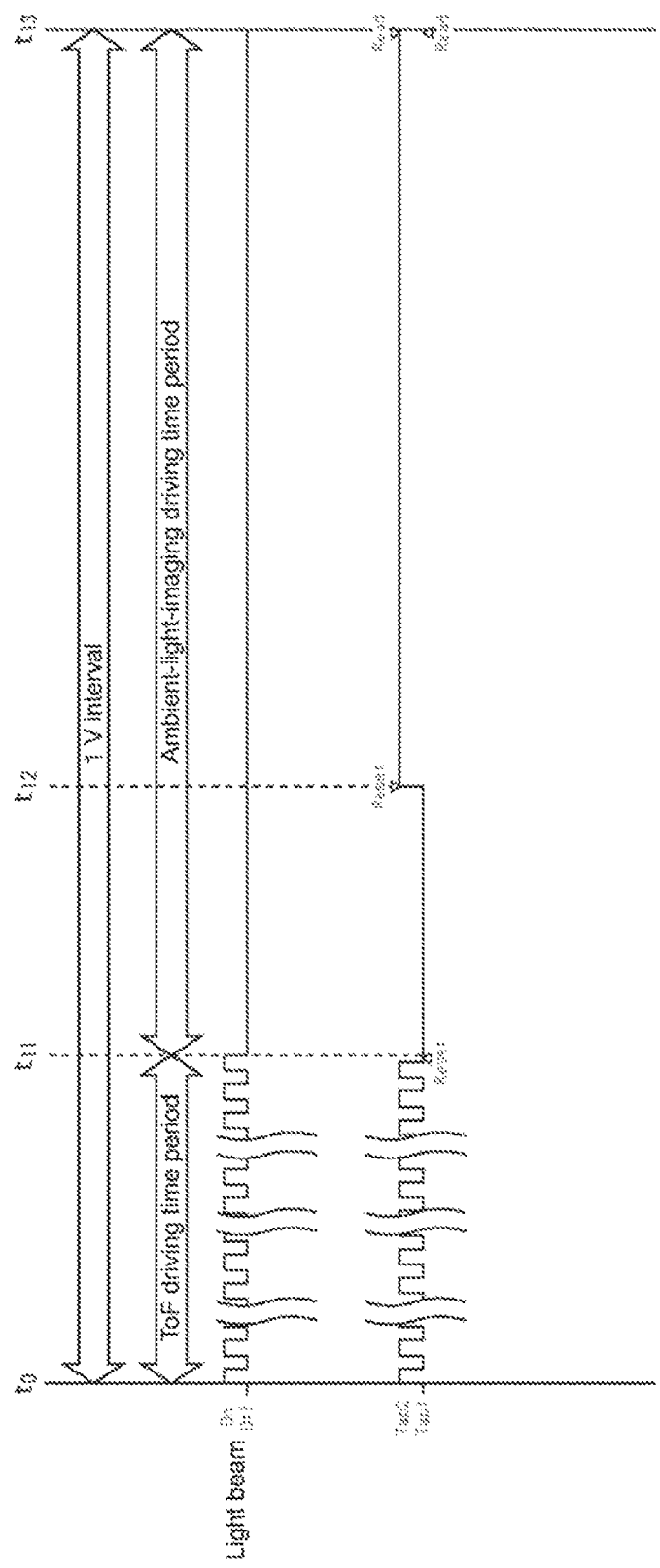
FIG. 5 is a diagram for describing a second driving method.

Next, a second driving method will be described. FIG. 5 is a timing chart for describing the second driving method.

In the second driving method, in the ambient-light-imaging driving time period, charges are accumulated in both of the first tap 53 and the second tap 54, and the charges are read.

The time period from the time t0 to a time t11 is the TOF driving time period, and TOF driving is performed and distance information is acquired as in the TOF driving time period in the first driving method described with reference to FIG. 4.

The time period from the time t11 to a time t13 is the ambient-light-imaging driving time period. First, charges are accumulated in the first tap 53. By executing reset processing on the first tap 53 before the time t11, the charges in the first tap 53 are swept out.

In the first tap 53, charges are accumulated from the time t11 to the time t12. By executing reset processing on the second tap 54 at the time t12, the charges in the second tap 54 are swept out. In the second tap 54, charges are accumulated from the time t12 to the time t13.

At the time t13, the charges accumulated in the first tap 53 and the second tap 54 are read under the control of the reading control unit 24, and supplied to the ambient light image generation unit 26.

The ambient light image generation unit 26 generates an image on the basis of the signal read from the first tap 53 and the second tap 54. This signal to be read is a signal depending on the amount of light received when the light source 21 is in an off-state. That is, it is a signal depending on the amount of received light, which is ambient light applied to a target object (subject) and reflected by the target object.

Further, when comparing the time period from the time t11 to the time t12 (time period T1) and the time period from the time t12 to the time t13 (time period T2), the time period T1 is shorter than the time period T2. In other words, the exposure time period for the first tap 53 is set to be shorter than the exposure time period for the second tap 54.

That is, in this case, charges at the time of short time exposure are accumulated in the first tap 53, and charges at the time of long time exposure are accumulated in the second tap 54. Therefore, according to the second driving method, it is possible to acquire an image at the time of short time exposure and an image at the time of long time exposure. As described above, the ambient light image generation unit 26 is capable of obtaining an image at the time of short time exposure and an image at the time of long time exposure, and generates an image with a high dynamic range (HDR (High Dynamic Range) image) by combining the obtained image at the time of short time exposure and the obtained image at the time of long time exposure.

As described above, it is possible to divide the 1 V interval into the TOF driving time period and the ambient-light-imaging driving time period, and acquire distance information in the TOF driving time period and an image of a subject with ambient light in the ambient-light-imaging driving time period. Further, it is possible to obtain the obtained image of a subject with ambient light as an HDR image.

Note that as in the first driving method, the TOF driving time period (from the time t0 to the time t11) and the ambient-light-imaging driving time period (from the time t11 to the time t13) may be appropriately changed depending on, for example, the exposure time period for performing imaging with ambient light. In other words, the TOF driving time period and the ambient-light-imaging driving time period may each be a fixed time period or a variable time period.

Further, the time period for the short time exposure (from the time t11 to the time t12) and the time period for the long time exposure (from the time t12 to the time t13) may each be a fixed exposure time period or a variable exposure time period.

Further, although a case where the long time exposure is performed after the short time exposure in the ambient-light-imaging driving time period has been described as an example in the example described with reference to FIG. 5, the short time exposure may be performed after the long time exposure.

Further, although an example where the first tap 53 is driven first in the ambient-light-imaging driving time period has been shown, the second tap 54 may be driven first.

<Third Driving Method>

Figure 6:
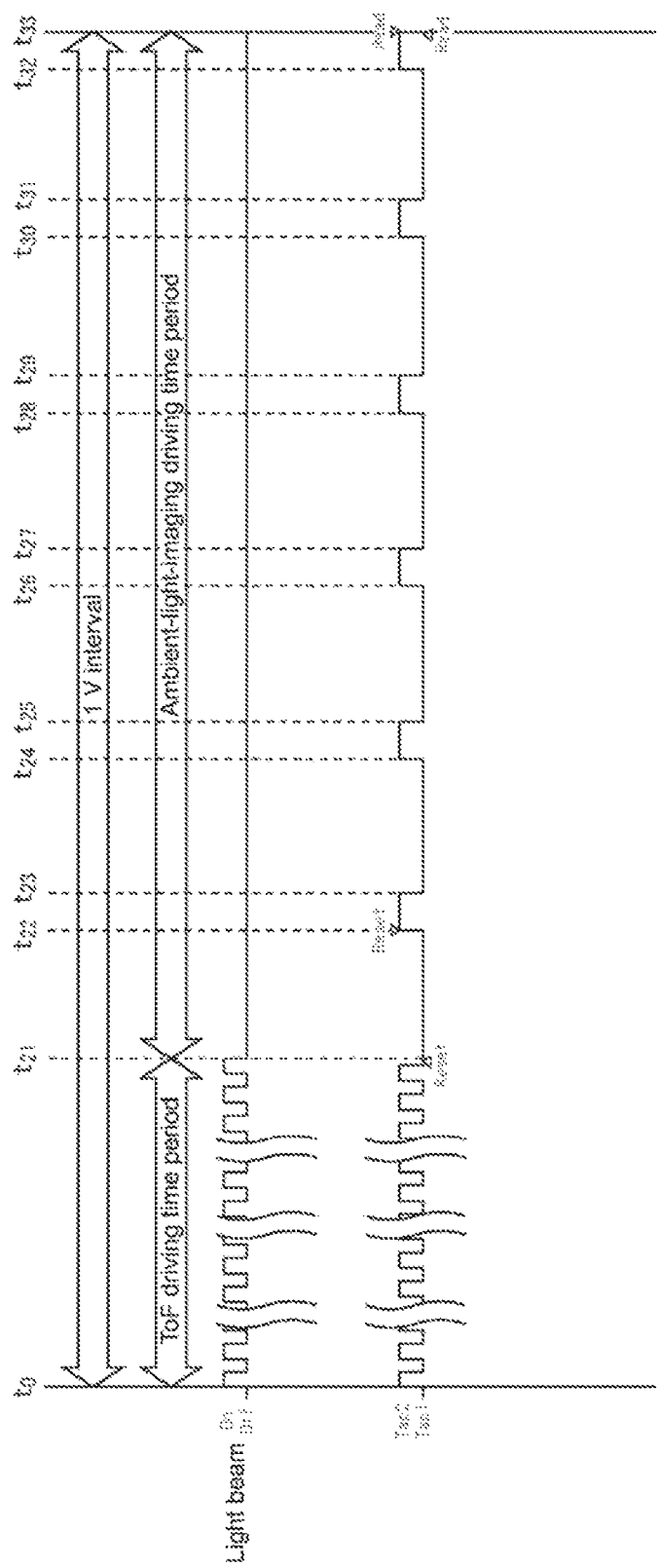
FIG. 6 is a diagram for describing a third driving method.

Next, a third driving method will be described. FIG. 6 is a timing chart for describing the third driving method.

In the third driving method, in the ambient-light-imaging driving time period, charges are accumulated in both of the first tap 53 and the second tap 54 and the charges are read. Further, in the third driving method, accumulation is alternately performed a plurality of times in the first tap 53 and the second tap 54 in the ambient-light-imaging driving time period.

The time period from the time t0 to a time t21 is the TOF driving time period, and TOF driving is performed and distance information is acquired as in the TOF driving time period in the first driving method described with reference to FIG. 4.

The time period from the time t21 to a time t32 is the ambient-light-imaging driving time period. First, charges are accumulated in the first tap 53. By executing reset processing on the first tap 53 before the time t21, the charges in the first tap 53 are swept out.

Charges are accumulated in the first tap 53 from the time t21 to a time t22. By executing reset processing on the second tap 54 at the time t22, the charges in the second tap 54 are swept out. Charges are accumulated in the second tap 54 from the time t22 to a time t23.

At the time t23, the accumulation in the second tap 54 is switched to accumulation in the first tap 53. Charges are accumulated in the first tap 53 from the time t23 to a time t24. At the time t24, the accumulation in the first tap 53 is switched to accumulation in the second tap 54. Charges are accumulated in the second tap 54 from the time t24 to a time t25.

At the time t25, the accumulation in the second tap 54 is switched to accumulation in the first tap 53. Charges are accumulated in the first tap 53 from the time t25 to a time t26. At the time t26, the accumulation in the first tap 53 is switched to accumulation in the second tap 54. Charges are accumulated in the second tap 54 from the time t26 to a time t27.

At the time t27, the accumulation in the second tap 54 is switched to accumulation in the first tap 53. Charges are accumulated in the first tap 53 from the time t27 to a time t28. At the time t28, the accumulation in the first tap 53 is switched to accumulation in the second tap 54. Charges are accumulated in the second tap 54 from the time t28 to a time t29.

At the time t29, the accumulation in the second tap 54 is switched to accumulation in the first tap 53. Charges are accumulated in the first tap 53 from the time t29 to a time t30. At the time t30, the accumulation in the first tap 53 is switched to accumulation in the second tap 54. Charges are accumulated in the second tap 54 from the time t30 to a time t31.

At the time t31, the accumulation in the second tap 54 is switched to accumulation in the first tap 53. Charges are accumulated in the first tap 53 from the time t31 to a time t32. At the time t32, the accumulation in the first tap 53 is switched to accumulation in the second tap 54. Charges are accumulated in the second tap 54 from the time t32 to the time t33.

At the time t33, the charges accumulated in the first tap 53 and the second tap 54 are read under the control of the reading control unit 24, and supplied to the ambient light image generation unit 26.

The ambient light image generation unit 26 generates an image on the basis of the signal read from the first tap 53 and the second tap 54. This signal to be read is a signal depending on the amount of light received when the light source 21 is in an off-state. That is, it is a signal depending on the amount of received light, which is ambient light applied to a target object (subject) and reflected by the target object.

Further, the time period when charges are accumulated in the first tap 53 (time period T11) is a time period obtained by adding the time periods from the time t21 to the time t22, from the time t23 to the time t24, from the time t25 to the time t26, from the time t27 to the time t28, from the time t29 to the time T30, and from the time T31 to the time t32.

Similarly, the time period when charges are accumulated in the second tap 54 (time period T12) is a time period obtained by adding the time periods from the time t22 to the time t23, from the time t24 to the time t26, from the time t26 to the time t28, from the time t28 to the time t30, from the time t30 to the time T31, and from the time T32 to the time t33.

When comparing the time period T11 and the time period T12, the time period T11 is longer than the time period T12. In other words, the exposure time period for the first tap 53 is set to be longer than the exposure time period for the second tap 54.

That is, in this case, charges at the time of long time exposure are accumulated in the first tap 53, and charges at the time of short time exposure are accumulated in the second tap 54. Therefore, according to the third driving method, it is possible to acquire an image at the time of long time exposure and an image at the time of short time exposure. As described above, the ambient light image generation unit 26 is capable of obtaining an image at the time of long time exposure and an image at the time of short time exposure, and generates an image with a high dynamic range (HDR image) by combining the obtained image at the time of long time exposure and the obtained image at the time of short time exposure.

As described above, it is possible to divide the 1 V interval into the TOF driving time period and the ambient-light-imaging driving time period, and acquire distance information in the TOF driving time period and an image of a subject with ambient light in the ambient-light-imaging driving time period. Further, it is possible to obtain the obtained image of a subject with ambient light as an HDR image.

Note that as in the first and second driving methods, the TOF driving time period (from the time t0 to the time t11) and the ambient-light-imaging driving time period (from the time t21 to the time t33) may be appropriately changed depending on, for example, the exposure time period for performing imaging with ambient light. In other words, the TOF driving time period and the ambient-light-imaging driving time period may each be a fixed time period or a variable time period.

Further, the time period for the long time exposure (time period T11) and the time period for the short time exposure (time period T12) may each be a fixed exposure time period or a variable exposure time period.

Further, although a case where the long time exposure is performed in the first tap 53 and the short time exposure is performed in the second tap 54 in the ambient-light-imaging driving time period has been described in the example described with reference to FIG. 6, the short time exposure may be performed in the first tap 53 and the long time exposure may be performed in the second tap 54.

Further, although an example where the first tap 53 is driven first in the ambient-light-imaging driving time period has been shown, the second tap 54 may be driven first.

According to the third driving method, it is possible to generate a favorable HDR image for a moving subject. According to the third driving method, since charges are alternately accumulated in the first tap 53 and the second tap 54 as described above, it is possible to perform, when imaging a moving subject, imaging with reduced influence thereof.

<Fourth Driving Method>

Figure 7:
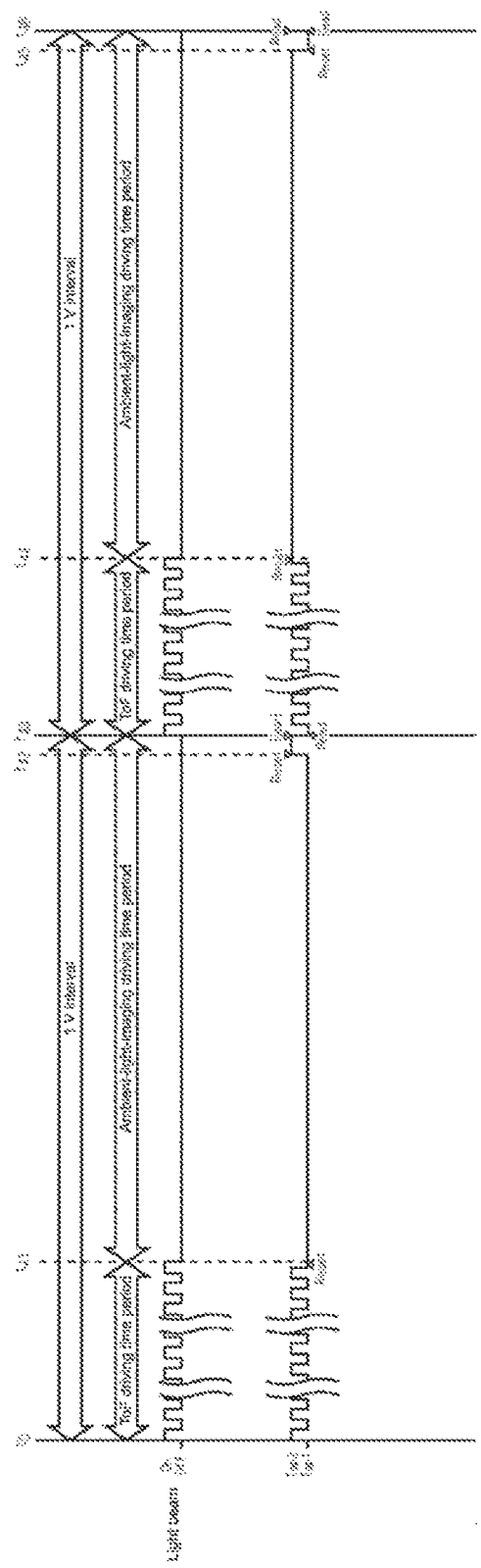
FIG. 7 is a diagram for describing a fourth driving method.

Next, a fourth driving method will be described. FIG. 7 is a timing chart for describing the fourth driving method.

In the fourth driving method, in the ambient-light-imaging driving time period, charges are accumulated in both of the first tap 53 and the second tap 54 and the charges are read.

The time period from the time t0 to a time t41 is the TOF driving time period, and TOF driving is performed and distance information is acquired as in the TOF driving time period in the first driving method described with reference to FIG. 4.

The time period from the time t41 to a time t43 is the ambient-light-imaging driving time period. First, charges are accumulated in the first tap 53. By executing reset processing on the first tap 53 before the time t41, the charges in the first tap 53 are swept out.

Charges are accumulated in the first tap 53 from the time t41 to a time t42. By executing reset processing on the second tap 54 at the time t42, the charges in the second tap 54 are swept out. Charges are accumulated in the second tap 54 from the time t42 to the time t43.

At the time t43, the charges accumulated in the first tap 53 and the second tap 54 are read under the control of the reading control unit 24, and supplied to the ambient light image generation unit 26.

When comparing the time period from the time t41 to the time t42 (time period T21) and the time period from the time t42 to the time t43 (time period T22), the time period T21 is longer than the time period T22. In other words, the exposure time period for the first tap 53 is set to be longer than the exposure time period for the second tap 54.

Although the time period T22 is a short time exposure time period, it is further shorter than the above-mentioned short time exposure time period in the second or third driving method, for example, and is a time period in which exposure is performed for only a very short time period. The signal obtained at the time of exposure in the time period T22 corresponds to dark noise, and is used as a signal for removing the dark noise.

In order to remove dark noise, a signal corresponding to two frames is used. Imaging of the first frame is performed first in this way, and then, imaging of the second frame is performed in the next time period.

Also the imaging of the second frame is performed basically similarly to the imaging of the first frame. First, the time period from the time t43 to a time t44 is the TOF driving time period, and TOF driving is performed and distance information is acquired.

Note that at the time of the imaging of the second frame, the TOF driving time period may be omitted and only the ambient-light-imaging driving time period may be provided. In the case where there is a need to acquire distance information for each frame, the TOF driving time period is provided for each frame. In the case where there is no need to acquire distance information for each frame, the TOF driving time period may be provided for every two frames, for example.

That is, the frequency for acquiring distance information may be set depending on, for example, how the distance information is used, and the TOF driving time period may be provided on the basis of the setting. Here, description will be continued on the assumption that the TOF driving time period is provided for each frame.

The time from the time t44 to a time t46 is the ambient-light-imaging driving time period for the two frames. First, charges are accumulated in the second tap 54. By executing reset processing on the second tap 54 before the time t44, the charges in the second tap 54 are swept out.

Charges are accumulated in the second tap 54 from the time t44 to a time t45. At the time t45, by executing reset processing on the first tap 53, the charges in the first tap 53 are swept out. Charges are accumulated in the first tap 53 from the time t45 to the time t46.

At the time t46, the charges accumulated in the first tap 53 and the second tap 54 are read under the control of the reading control unit 24, and supplied to the ambient light image generation unit 26.

In the second frame, when comparing the time period from the time t44 to the time t45 (time period T23) and the time period from the time t45 to the time t46 (time period t24), the time period T23 is longer than the time period t24. In other words, the exposure time period for the second tap 54 is set to be longer than the exposure time period for the first tap 53.

In the imaging of the first frame, charges are accumulated in the first tap 53 by long time exposure, and charges are accumulated in the second tap 54 by short time exposure. In the imaging of the second frame, charges are accumulated in the second tap 54 by long time exposure, and charges are accumulated in the first tap 53 by short time exposure.

As described above, the taps corresponding to the long time exposure and the short time exposure are switched in the first frame and the second frame.

Here, an image obtained at the time of long time exposure in an ambient-light-imaging driving time period n of the first frame (n-th frame, hereinafter, referred to as the frame $F_n$) (image based on charges accumulated in the first tap 53 during the time period from the time t41 to the time t42) is referred to as a long time exposure image $I_{1,n}$, and an image obtained at the time of short time exposure (image based on charges accumulated in the second tap 54 during the time period from the time t42 to the time t43) is referred to as a short time exposure image $I_{2,n}$.

Similarly, an image obtained at the time of long time exposure in an ambient-light-imaging driving time period n+1 of the second frame (n+1-th frame, hereinafter, referred to as the frame $F_{n+1}$) (image based on charges accumulated in the second tap 54 during the time period from the time t44 to the time t45) is referred to as a long time exposure image $I_{2,n+1}$, and an image obtained at the time of short time exposure (image based on charges accumulated in the first tap 53 during the time period from the time t45 to the time t46) is referred to as a short time exposure image $I_{1,n+1}$.

In this case, the image obtained in the n-th frame at the time of short time exposure (here, the short time exposure image $I_{2,n}$) is an image with noise components, and the image obtained at the time of long time exposure (here, the long time exposure image $I_{1,n}$) is an image with noise components and ambient light components.

Similarly, the image obtained in the n+1 frame at the time of short time exposure (here, the short time exposure image $I_{1,n+1}$) is an image with noise components, and the image obtained at the time of long time exposure (here, the long time exposure image $I_{2,n+1}$) is an image with noise components and ambient light components.

It can be seen that in order to generate an image with removed noise components, it only needs to subtract the image with noise components from the image with noise components and ambient light components. In the case of subtracting the image with noise component from the image with noise components and ambient light components obtained from the same tap to generate an image (frame) with removed noise components, it can be obtained by the following equations.

The first frame (frame $F_n$) is obtained by the following equation.

Frame $F_n$=long time exposure image $I_{1,n}$-short time exposure image

The second frame (frame $F_{n+1}$) is obtained by the following equation.

Frame $F_{n+1}$=long time exposure image $I_{2,n+1}$-short time exposure image $I_{2,n}$ The third frame (frame $F_{n+2}$) is obtained by the following equation.

Frame $F_{n+2}$=long time exposure image $I_{1,n+2}$-short time exposure image $I_{1,n+1}$ The fourth frame (frame $F_{n+3}$) and subsequent frames are also obtained in a similar way. That is, they are each obtained by subtracting, from an image (e.g., long time exposure image $I_{1,n}$) at the time of long time exposure obtained in the generated frame (e.g., frame $F_n$), an image (e.g., short time exposure image $I_{1,n-1}$) at the time of short time exposure obtained in the previous frame (e.g., frame $F_{n-1}$).

In this case, by calculating the difference between the image at the time of long time exposure and the image at the time of short time exposure obtained by the same tap (the first tap 53 or the second tap 54), an image with removed noise is generated. Since the noise components differ depending on the tap in some cases, an image with removed noise is generated by using the difference between images obtained from the same tap.

In the above-mentioned method of removing noise (referred to as the first noise removal method), an image at the time of long time exposure and an image at the time of short time exposure obtained from the same tap are used, and noise is removed by subtracting an image at the time of short time exposure obtained in the ambient-light-imaging driving time period n−1 before an image at the time of long time exposure in the ambient-light-imaging driving time period n.

That is, an image with removed noise is generated by using images obtained in the ambient-light-imaging driving time periods of two frames.

A method of generating an image with removed noise (referred to as the second noise removal method) by alternately repeating removing of noise by subtracting an image at the time of short time exposure obtained before an image at the time of long time exposure and removing of noise by subtracting an image at the time of short time exposure obtained after an image at the time of long time exposure, which is the same as the first noise removal method in that noise is removed by using images of two frames, will be described.

In the second noise removal method, the first frame (frame $F_n$) is obtained by the following equation.

Frame $F_n$=long time exposure image $I_{1,n}$-short time exposure image $I_{1,n+1}$ The second frame (frame $F_{n+1}$) is obtained by the following equation.

Frame $F_{n+1}$=long time exposure image $I_{2,n+1}$-short time exposure image $I_{2,n}$ The third frame (frame $F_{n+2}$) is obtained by the following equation.

Frame $F_{n+2}$=long time exposure image $I_{1,n+2}$-short time exposure image $I_{1,n+3}$ The fourth frame (frame $F_{n+3}$) is obtained by the following equation.

Frame $F_{n+3}$=long time exposure image $I_{2,n+3}$-short time exposure image $I_{2,n+2}$ The fifth frame (frame $F_{n+4}$) and subsequent frames are also obtained in a similar way.

The frame $F_n$ is obtained by subtracting, from the long time exposure image $I_{1,n}$ obtained from the first tap 53 in the ambient-light-imaging driving time period n, the short time exposure image $I_{1,n+1}$ obtained from the first tap 53 in the ambient-light-imaging driving time period n+1 after the ambient-light-imaging driving time period n.

The frame $F_{n+1}$ is obtained by subtracting, the long time exposure image $I_{2,n+1}$ from obtained from the second tap 54 in the ambient-light-imaging driving time period n+1, the short time exposure image $I_{2,n}$ obtained from the second tap 54 in the ambient-light-imaging driving time period n before the ambient-light-imaging driving time period n+1.

In the second noise removal method, the frame $F_n$ and the frame $F_{n+1}$ are respectively generated from an image at the time of long time exposure and an image at the time of short time exposure obtained in the ambient-light-imaging driving time period n and the ambient-light-imaging driving time period n+1.

Similarly, in the second noise removal method, the frame $F_{n+2}$ and the frame $F_{n+3}$ are respectively generated from an image at the time of long time exposure and an image at the time of short time exposure obtained in the ambient-light-imaging driving time period n+2 and the ambient-light-imaging driving time period n+3.

As described above, in the second noise removal method, two frames are generated from an image at the time of long time exposure and an image at the time of short time exposure obtained in two consecutive ambient-light-imaging driving time periods. In this case, processing closed for the two ambient-light-imaging driving time periods is executed.

Further, an image with removed noise may be generated by processing closed for one ambient-light-imaging driving time period (which will be referred to as the third noise removal method).

In the third noise removal method, the first frame (frame $F_n$) is obtained by the following equation.

Frame $F_n$=long time exposure image $I_{1,n}$-short time exposure image $I_{2,n}$ The second frame (frame $F_{n+1}$) is obtained by the following equation.

Frame $F_{n+1}$=long time exposure image $I_{2,n+1}$-short time exposure image $I_{1,n+1}$ The third frame (frame $F_{n+2}$) and subsequent frames are also obtained in a similar way.

The frame $F_n$ is obtained by subtracting, from the long time exposure image $I_{1,n}$ obtained from the first tap 53 in the ambient-light-imaging driving time period n, the short time exposure image $I_{2,n}$ obtained from the second tap 54.

The frame $F_n$ is obtained by subtracting, from the long time exposure image $I_{2,n+1}$ obtained from the second tap 54 in the ambient-light-imaging driving time period n+1, the short time exposure image $I_{1,n+1}$ obtained from the first tap 53.

As described above, an image with removed noise is generated from the difference between an image at the time of long time exposure and an image at the time of short time exposure obtained in the same ambient-light-imaging driving time period.

As described above, according to the fourth driving method, it is possible to generate an image with removed noise without removing noise by CDS (Correlated Double Sampling) or the like. The imaging apparatus 10 generates also distance information as described above. However, regarding the distance information, the distance is obtained by subtracting two accumulation amounts and using the difference as described with reference to FIG. 3. Therefore, even in the case where the accumulation amounts include noise components, the noise components are removed by the difference.

Therefore, for example, in the case where distance information is acquired by the TOF method, noise removal processing such as CDS is not executed in some cases. According to the fourth driving method, even in such a configuration without executing noise removal processing, it is possible to generate an image with removed noise.

In the fourth driving method, the reset timing may be adjusted so that the long time exposure time period is not saturated.

For example, although reset processing is executed on the first tap 53 at (before) the time t41 in FIG. 7, it is possible to reduce the time period in which charges are stored in the first tap 53 by setting the timing of executing the reset processing to be later than the time t41, for example. That is, it is possible to reduce the exposure time period for the first tap 53.

As described above, a mechanism for controlling the long time exposure time period by adjusting it using the reset timing so that the long time exposure time period is not saturated may be provided.

Further, the long time exposure time period may be set by using a pixel value obtained in the TOF driving time period.

Further, similarly, the reset timing may be adjusted so that the short time exposure time period is not saturated. Further, it may be controlled by the reset timing of one or both of the long time exposure time period and the short time exposure time period so that it is not saturated.

By combining any of the first to third driving methods and the fourth driving method, it is possible to generate an image with removed noise as an HDR image. In the case of combining any of the first to third driving methods and the fourth driving method, they can be combined by time division.

In the fourth driving method, the pixels may be divided, in units of pixels (or taps), into two groups, i.e., a group of long time exposure pixels and a group of short time exposure group, and the driving by the fourth driving method may be performed for each pixel. Further, the pixels may be divided, in units of lines, into two groups, i.e., a group of long time exposure pixels and a group of short time exposure pixels, and the driving by the fourth driving method may be performed for each pixel.

As described above, an HDR image may be generated by providing long time exposure pixels and short time exposure pixels to acquire a long time exposure image and a short time exposure image.

As described above, according to the present technology, it is possible to acquire an ambient light picked-up image by distance information (distance image) and ambient light. Further, since the light emission of the light source 21 is stopped when picking up an ambient light picked-up image, it is possible to reduce the power consumption consumed by the light source 21. Further, high-speed charge distribution driving in the time direction is performed in the first tap 53 and the second tap 54 in the TOF driving time period, but high-speed charge distribution driving is not performed in the ambient-light-imaging driving time period. Therefore, it is possible to reduce the power consumption by that amount.

In the above-mentioned embodiments, the pixel provided with two taps of the first tap 53 and the second tap 54 has been described as an example. That is, as shown in FIG. 8A, the pixel in which on photodiode 52 is provided with two taps of the first tap 53 and the second tap 54 for distributing charges accumulated in the photodiode 52 has been described as an example.

However, the application range of the present technology is not limited to the pixel having such a configuration. For example, as shown in FIG. 8B, the above-mentioned embodiments are applicable also to a pixel provided with one tap.

Figure 8B:
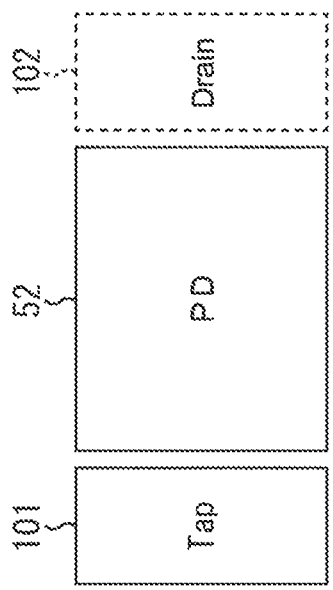
FIGS. 8A and 8B is a are diagrams showing another structure of the pixel.
Figure 8A:
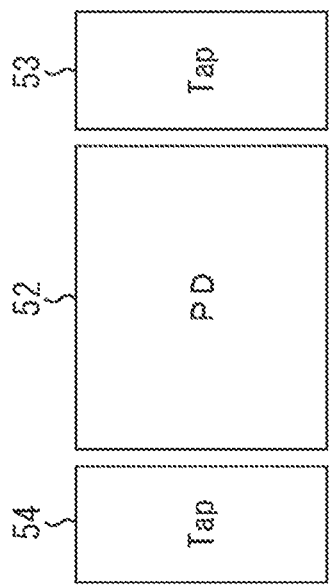

In the pixel constituting the TOF sensor shown in FIG. 8B, one photodiode 52 is provided with one tap 101. Further, the one photodiode 52 includes an area 102 (referred to as the drain 102 here) provided to discharge charges at the time of resetting or saturation.

In the pixel shown in FIG. 8B, the tap 101 corresponds to the first tap 53 or the second tap 54 described above, for example. Further, in the pixel shown in FIG. 8B, the drain 102 corresponds to the first tap 53 or the second tap 54 described above. For example, in the case where the tap 101 corresponds to the first tap 53, the drain 102 corresponds to the second tap 54.

In the above-mentioned embodiments (first to fourth embodiments), by using the first tap 53 and the second tap 54 as the tap 101 and the drain 102, respectively, the present technology can be applied also to the TOF sensor having the one tap configuration shown in FIG. 8B.

As described above, the present technology is applicable also to a TOF sensor other than the above-mentioned TOF sensor having the two-tap configuration.

<Regarding Recording Medium>

The above-mentioned sequence of processing, e.g., control of turning on and off of light emission of the light source 21, setting of the exposure time period, and control relating to distribution of charges to the tap in the set exposure time period, can be performed by hardware or software. In the case where the sequence of processing is performed by software, programs configuring the software are installed into a computer. Here, the computer includes a computer incorporated in dedicated hardware and, for example, a generally-used personal computer that installs various programs to be able to execute various functions.

Figure 9:
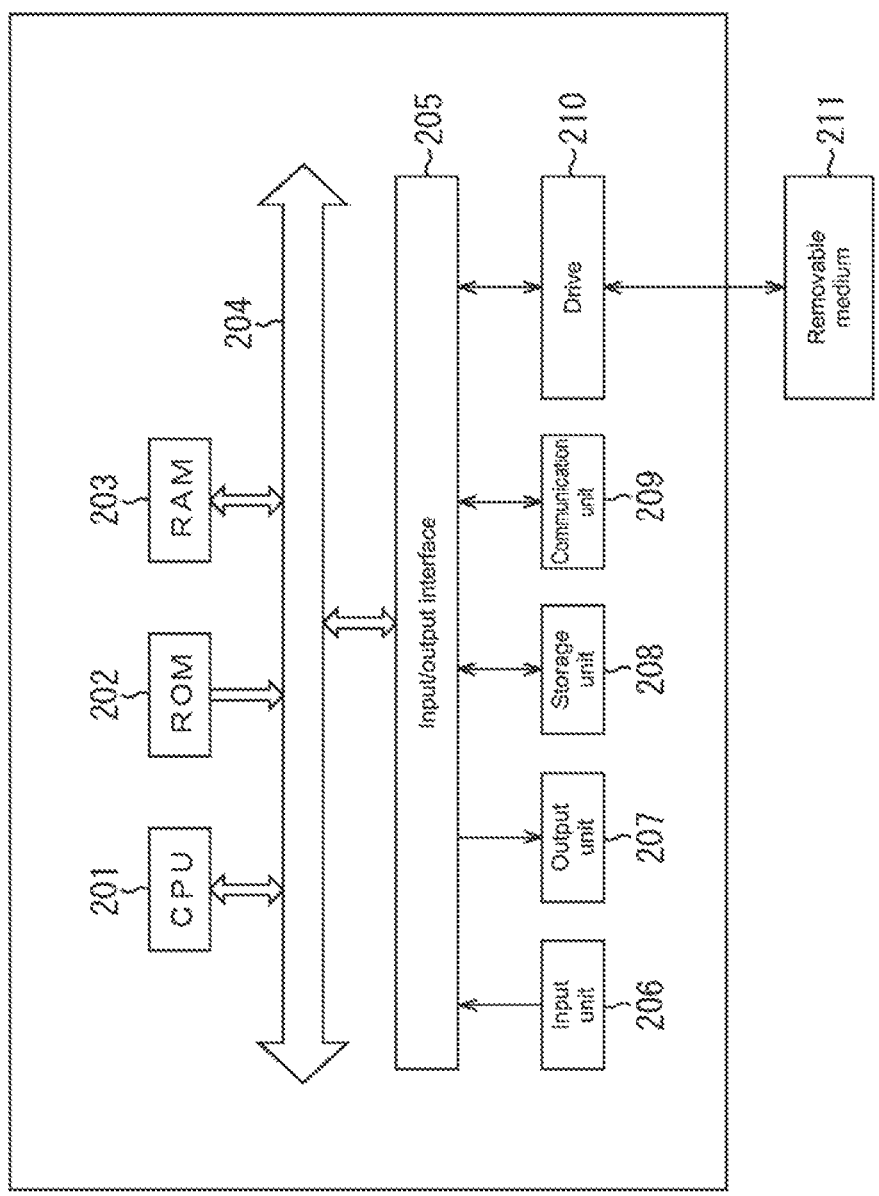
FIG. 9 is a diagram for describing a recording medium.

FIG. 9 is a block diagram showing a configuration example of hardware of a computer executing the above-mentioned sequence of processing by a program. In the computer, a CPU (Central Processing Unit) 201, a ROM (Read Only Memory) 202, and a RAM (Random Access Memory) 203 are connected to each other via a bus 204. Further, an input/output interface 205 is connected to the bus 204. An input unit 206, an output unit 207, a storage unit 208, a communication unit 209, and a drive 210 are connected to the input/output interface 205.

The input unit 206 includes a keyboard, a mouse, a microphone, and the like. The output unit 207 includes a display, a speaker, and the like. The storage unit 208 includes a hard disk or a non-volatile memory. The communication unit 209 includes a network interface and the like. The drive 210 drives a removable medium 211 including a magnetic disc, an optical disc, a magnetic optical disc, a semiconductor memory or the like.

In the computer configured as described above, by the CPU 201 loading programs stored in, for example, the storage unit 208 into the RAM 203 via the input/output interface 205 and the bus 204 and executing the programs, the above-mentioned sequence of processing is performed.

The program that is executed by the computer (the CPU 201) can be recorded, for example, in the removable medium 211 that is a package medium and thus may be provided. Alternatively, the program may be provided via a wired or wireless transmission medium such as a local area network, the Internet, and digital satellite broadcasting.

In the computer, the program can be installed in the storage unit 208 via the input/output interface 205 by mounting the removable medium 211 onto the drive 210. Further, the program can be received with the communication unit 209 via the wired or wireless transmission medium and installed in the storage unit 208. In addition, the program can be installed in advance in the ROM 202 or the storage unit 208.

It should be noted that the program that is executed by the computer may be a program by which the processing is performed in time series in the order described in the present specification, or may be a program by which the processing is performed in parallel or at a necessary timing, such as when a request to execute the processing is made.

Further, in the present specification, the system an entire apparatus including a plurality of apparatuses.

It should be noted that the effects described in the present specification are merely examples and are not limited, and additional effects may be provided.

It should be noted that the embodiment of the present technology is not limited to the above-mentioned embodiments and various modifications can be made without departing from the essence of the present technology.

It should be noted that the present technology may take the following configurations.

(1)

An imaging apparatus, including:

a light source that emits light;

an accumulation unit, charges corresponding to received light being accumulated in the accumulation unit;

a distance information generation unit that generates distance information from an amount of the charges accumulated in the accumulation unit; and an image generation unit that generates an image from the amount of the charges accumulated in the accumulation unit, the distance information generation unit generating, when the light source emits the light, the distance information from the amount of the charges accumulated in the accumulation unit, the image generation unit generating, when the light source emits no light, the image from the amount of the charges accumulated in the accumulation unit.

(2)

The imaging apparatus according to (1) above, in which the accumulation unit includes a first tap and a second tap, and when the light source emits the light, charges are alternately accumulated in the first tap and the second tap.

(3)

The imaging apparatus according to (2) above, in which when the light source emits no light, charges are accumulated in one of the first tap and the second tap.

(4)

The imaging apparatus according to (2) above, in which when the light source emits no light, charges at the time of long time exposure are accumulated in one of the first tap and the second tap, and charges at the time of short time exposure are accumulated in the other.

(5)

The imaging apparatus according to (4) above, in which charges are alternately accumulated in the first tap and the second tap.

(6)

The imaging apparatus according to (4) above, in which in a predetermined frame, charges at the time of long time exposure are accumulated in the first tap and charges at the time of short time exposure are accumulated in the second tap, and in the next frame of the predetermined frame, charges at the time of short time exposure are accumulated in the first tap and charges at the time of long time exposure are accumulated in the second tap.

(7)

The imaging apparatus according to any one of (4) to (6) above, in which the image generation unit generates an image with a high dynamic range from an image based on an amount of the charges accumulated at the time of long time exposure and an image based on an amount of the charges accumulated at the time of short time exposure.

(8)

The imaging apparatus according to (6) above, in which the image generation unit generates the image by subtracting the image based on the amount of the charges accumulated at the time of short time exposure in the next frame from the image based on the amount of the charges accumulated at the time of long time exposure in the predetermined frame.

(9)

The imaging apparatus according to (6) above, in which the image generation unit generates the image in the predetermined frame by subtracting the image based on the amount of the charges accumulated at the time of short time exposure in the next frame from the image based on the amount of the charges accumulated at the time of long time exposure in the predetermined frame, and the image in the next frame by subtracting the image based on the amount of the charges accumulated at the time of short time exposure in the predetermined frame from the image based on the amount of the charges accumulated at the time of long time exposure in the next frame.

(10)

The imaging apparatus according to (6) above, in which the image generation unit generates the image in the predetermined frame by subtracting the image based on the amount of the charges accumulated at the time of short time exposure in the predetermined frame from the image based on the amount of the charges accumulated at the time of long time exposure in the predetermined frame.

(11)

The imaging apparatus according to any one of (6) to (10) above, in which an exposure time period for the long time exposure is controlled by adjusting timing of resetting the first tap or the second tap in which the charges at the time of long time exposure are accumulated.

(12)

The imaging apparatus according to any one of (6) to (11) above, in which an exposure time period for the short time exposure is controlled by adjusting timing of resetting the first tap or the second tap in which the charges at the time of short time exposure are accumulated.

(13)

The imaging apparatus according to any one of (2) to (12) above, in which one of the first tap and the second tap includes an area that discharges the charges at the time of resetting the storage unit or saturation of the storage unit.

(12)

An imaging method for an imaging apparatus including a light source that emits light, the imaging method including:

accumulating charges corresponding to received light;

generating distance information from an amount of the accumulated charges;

generating an image from the amount of the accumulated charges;

generating, when the light source emits the light, the distance information from the amount of the accumulated charges; and generating, when the light source emits no light, the image from the amount of the accumulated charges.

(13)

A program that causes a computer controlling an imaging apparatus including a light source that emits light to execute the steps of:

accumulating charges corresponding to received light;

generating distance information from an amount of the accumulated charges;

generating an image from the amount of the accumulated charges;

generating, when the light source emits the light, the distance information from the amount of the accumulated charges; and generating, when the light source emits no light, the image from the amount of the accumulated charges.

REFERENCE SIGNS LIST

10 imaging apparatus
21 light source
22 light source control unit
23 imaging unit
24 reading control unit
25 distance image generation unit
26 ambient light image generation unit

The invention claimed is:

1. An imaging apparatus, comprising:

a light source configured to emit light;

an accumulation unit configured to:

control reception of the light emitted from the light source;

accumulate a first amount of charges corresponding to the received light, wherein the accumulation unit includes a first tap and a second tap; and accumulate, in case the light source emits no light, a second amount of charges at each of a time of a long time exposure and a time of a short time exposure, wherein the charges at the time of the long time exposure are accumulated in one of the first tap or the second tap, and the charges at the time of the short time exposure are accumulated in the other of the first tap or the second tap; and a central processing unit (CPU) configured to:

control, in case of the emission of the light from the light source, generation of distance information from the first amount of the charges accumulated in the accumulation unit; and control, in case the light source emits no light, generation of a specific image from the second amount of the charges accumulated in the accumulation unit.

2. The imaging apparatus according to claim 1, wherein the second amount of the charges are alternately accumulated in the first tap and the second tap.

3. The imaging apparatus according to claim 1, wherein
in a first frame, the charges at the time of the long time exposure are accumulated in the first tap and the charges at the time of the short time exposure are accumulated in the second tap,
in a second frame, the charges at the time of the short time exposure are accumulated in the first tap and the charges at the time of the long time exposure are accumulated in the second tap, and
the second frame is subsequent to the first frame.

4. The imaging apparatus according to claim 1, wherein
the CPU is further configured to control generation of a high dynamic range (HDR) image from a first image and a second image,
the first image is based on the charges accumulated at the time of the long time exposure, and
the second image is based on the charges accumulated at the time of the short time exposure.

5. The imaging apparatus according to claim 3, wherein the CPU is further configured to:
control generation of a first image based on the charges accumulated at the time of the long time exposure in the first frame;
control generation of a second image based on the charges accumulated at the time of the short time exposure in the second frame; and
control generation of the specific image based on subtraction of the second image from the first image.

6. The imaging apparatus according to claim 3, wherein the CPU is further configured to:
control generation of a first image based on the charges accumulated at the time of the long time exposure in the first frame;
control generation of a second image based on the charges accumulated at the time of the short time exposure in the second frame;
control generation of the specific image in the first frame based on subtraction of the second image from the first image;
control generation of a third image based on the charges accumulated at the time of the short time exposure in the first frame;
control generation of a fourth image based on the charges accumulated at the time of the long time exposure in the second frame; and
generate the specific image in the second frame based on subtraction of the third image from the fourth image.

7. The imaging apparatus according to claim 3, wherein the CPU is further configured to:
control generation of a first image based on the charges accumulated at the time of the short time exposure in the first frame;
control generation of a second image based on the charges accumulated at the time of the long time exposure in the first frame; and
control generation of the specific image based on subtraction of the first image from the second image.

8. The imaging apparatus according to claim 3, wherein
the CPU is further configured to adjust a reset timing of one of the first tap or the second tap based on the accumulation of the charges at the time of the long time exposure in the one of the first tap or the second tap, and
the reset timing is adjusted to control an exposure time period for the long time exposure.

9. The imaging apparatus according to claim 3, wherein
the CPU is further configured to adjust a reset timing of one of the first tap or the second tap based on the accumulation of the charges at the time of the short time exposure in the one of the first tap or the second tap, and
the reset timing is adjusted to control an exposure time period for the short time exposure.

10. An imaging method, comprising:
in an imaging apparatus including a light source configured to emit light:
controlling reception of the light emitted from the light source;
accumulating a first amount of charges corresponding to the received light;
accumulating, in case the light source emits no light, a second amount of charges at each of a time of a long time exposure and a time of a short time exposure, wherein
the charges at the time of the long time exposure are accumulated in one of a first tap or a second tap, and
the charges at the time of the short time exposure are accumulated in the other of the first tap or the second tap;
generating, in case of the emission of the light from the light source, distance information from the first amount of the accumulated charges; and
generating, in case the light source emits no light, an image from the second amount of the accumulated charges.

11. A non-transitory computer-readable medium having stored thereon computer-readable instructions, which when executed by an image processing device, cause the image processing device to execute operations, the operations comprising:
controlling reception of light from a light source, wherein the image processing device includes the light source configured to emit the light;
accumulating a first amount of charges corresponding to the received light;
accumulating, in case the light source emits no light, a second amount of charges at each of a time of a long time exposure and a time of a short time exposure, wherein
the charges at the time of the long time exposure are accumulated in one of a first tap or a second tap, and
the charges at the time of the short time exposure are accumulated in the other of the first tap or the second tap;
generating, in case of the emission of the light from the light source, distance information from the first amount of the accumulated charges; and
generating, in case the light source emits no light, an image from the second amount of the accumulated charges.

* * * * *